United States Patent
Behrens et al.

(10) Patent No.: US 9,112,721 B2
(45) Date of Patent: Aug. 18, 2015

(54) SYSTEM AND METHODS FOR ENABLING A CONTROLLER AREA NETWORK (CAN) DEVICE TO OPERATE IN DIFFERENT POWER MODES BASED UPON THE PAYLOAD OF A WAKE-UP MESSAGE

(75) Inventors: Frank Herman Behrens, Campinas (BR); Patricia Elaine Domingues, Jaguariuna (BR); Marcelo Marinho, Campinas (BR); Jose Arnaldo Mascagni de Holanda, Araraquara (BR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 382 days.

(21) Appl. No.: 13/481,908

(22) Filed: May 28, 2012

(65) Prior Publication Data
US 2013/0318380 A1 Nov. 28, 2013

(51) Int. Cl.
*G06F 1/00* (2006.01)
*H04L 12/40* (2006.01)
*G06F 1/32* (2006.01)
*H04L 12/12* (2006.01)

(52) U.S. Cl.
CPC ........ *H04L 12/40039* (2013.01); *G06F 1/3203* (2013.01); *H04L 12/12* (2013.01); *H04L 2012/40215* (2013.01); *H04L 2012/40273* (2013.01); *Y02B 60/32* (2013.01); *Y02B 60/34* (2013.01)

(58) Field of Classification Search
CPC ..................... H04L 2012/40273; Y02B 60/34; Y02B 60/32; G06F 1/3203
USPC .......... 713/310, 323, 324, 300, 320; 375/219; 370/225, 252
See application file for complete search history.

(56) References Cited

U.S. PATENT DOCUMENTS

| | | | |
|---|---|---|---|
| 6,654,355 B1 * | 11/2003 | Marbach et al. | .............. 370/285 |
| 6,728,892 B1 | 4/2004 | Silvkoff et al. | |
| 7,085,595 B2 | 8/2006 | Kitchin | |
| 7,210,049 B2 | 4/2007 | Disser | |

(Continued)

OTHER PUBLICATIONS

Schmutzler, Energy Efficiency in Automotive Networks: Assessment and Concepts, International Conference on High Performance Computing and Simulation (HPCS), Aug. 12, 2010, IEEE Xplore, pp. 232-240.

(Continued)

*Primary Examiner* — Thomas Lee
*Assistant Examiner* — Aurel Prifti
(74) *Attorney, Agent, or Firm* — Luiz Von Paumgartten; Fogarty, L.L.C.

(57) ABSTRACT

Systems and methods for handling wake-up messages in a Controller Area Network (CAN) are described. In some embodiments, a method may include operating a CAN controller in a selected one of a plurality of operating modes in response to the detection of an event or activity on a CAN bus. The method may also include handling, by the CAN controller, a CAN message using a message handling protocol associated with the selected one of the plurality of operating modes, for example, while a host processor operates in a low power mode. In various implementations, each of the plurality of operating modes may correspond to a different amount of power consumption by the CAN controller. The method may further include transmitting a selected one of a plurality of response messages by the CAN controller over the CAN bus, in some cases, without waking up the processor from the low power mode.

20 Claims, 5 Drawing Sheets

(56) References Cited

U.S. PATENT DOCUMENTS

| | | | |
|---|---|---|---|
| 7,539,888 B2* | 5/2009 | Hu et al. | 713/324 |
| 7,653,822 B2 | 1/2010 | Schaver | |
| 7,957,332 B1 | 6/2011 | Chow et al. | |
| 8,392,731 B2* | 3/2013 | Asano et al. | 713/310 |
| 8,650,341 B2* | 2/2014 | Dawson et al. | 710/52 |
| 8,750,351 B2* | 6/2014 | Muth | 375/219 |
| 2006/0050735 A1 | 3/2006 | Isaac et al. | |
| 2008/0276107 A1* | 11/2008 | Bogavac | 713/323 |
| 2009/0080442 A1* | 3/2009 | Narayan et al. | 370/400 |
| 2011/0013510 A1* | 1/2011 | All et al. | 370/225 |
| 2011/0055831 A1* | 3/2011 | Heller, Jr. | 718/100 |
| 2011/0107115 A1* | 5/2011 | Verdun | 713/300 |
| 2011/0296212 A1* | 12/2011 | Elnozahy et al. | 713/320 |
| 2012/0045201 A1* | 2/2012 | Skubic et al. | 398/38 |
| 2012/0054515 A1* | 3/2012 | Naffziger et al. | 713/320 |
| 2012/0188885 A1* | 7/2012 | Tazebay et al. | 370/252 |
| 2012/0210154 A1* | 8/2012 | Hartwich | 713/323 |
| 2012/0290859 A1* | 11/2012 | Saladin et al. | 713/310 |

OTHER PUBLICATIONS

BMW, Energy Saving Strategies in Future Automotive E/E Architectures, Freescale Technology Forum (http://www.freescale.com/files/ftf_2010/Americas/WBNR_FTF10_AUT-F0858.pdf), Jun. 20, 2010, pp. 1-41.

Vector, ECU Testing for Electrical and Hybrid Vehicles, Press Article (http://www.vector.com/portal/medien/cmc/press/Vector/EV_VTSystem_AEL_201108_PressArticle_EN.pdf), Aug. 2011, pp. 1-4.

NPX, NXP introduces Partial Networking solution for vehicles—a milestone in CO2 reduction and energy efficiency, Press Release (http://www.nxp.com/news/press-releases/2011/08/nxp-introduces-partial-networking-solution-for-vehicles-a-milestone-in-co2-reduction-and-energy-efficiency.html), Aug. 18, 2011, pp. 1-2.

Willie, Support of energy efficient technologies by AUTOSAR—Partial Networking & Co, ProductDay—Automotive Networks Software Architecture, Technical Session, Nov. 16, 2011, pp. 1-3.

* cited by examiner

SYSTEM AND METHODS FOR ENABLING A CONTROLLER AREA NETWORK (CAN) DEVICE TO OPERATE IN DIFFERENT POWER MODES BASED UPON THE PAYLOAD OF A WAKE-UP MESSAGE

FIELD

This disclosure relates generally to controller area networks, and more specifically, to systems and methods of handling wake-up messages in controller area networks.

BACKGROUND

A Controller Area Network (CAN) is an asynchronous serial bus network that connects devices, sensors, and actuators in various control applications (e.g., automotive, industrial automation, avionics, medical and office equipment, consumer appliances, etc.). Different CAN networks have different performance characteristics. Automotive CAN networks, for example, may be divided into two distinct categories—body control and powertrain. Body control networks enable communications among passenger comfort and convenience systems, and are typically less resource-intensive than powertrain networks, which service engine and transmission control.

Over the course of the last decade, two major physical layer designs have emerged in most CAN applications. They both communicate using a differential voltage on a pair of wires and are commonly referred to as a high-speed CAN (e.g., at rates of up to 1 Mbps) and low-speed CAN (e.g., at rates of up to 125 Kbps). Other CAN interfaces, however, may communicate using a single wire (e.g., at rates of up to 33.3 Kbps). Generally speaking, each node in a CAN network may be able to transmit and receive messages over a CAN bus.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments disclosed herein are directed to systems and methods for handling messages (e.g., "wake-up" messages) transmitted and/or received over a communication bus. In some implementations, these systems and methods may be particularly well suited for deployment in a Controller Area Network (CAN). Although some of the examples herein are discussed in the context of automotive environments, these techniques may also be employed in other environments (e.g., industrial automation, avionics, medical and office equipment, consumer appliances, etc.).

Figure 1:
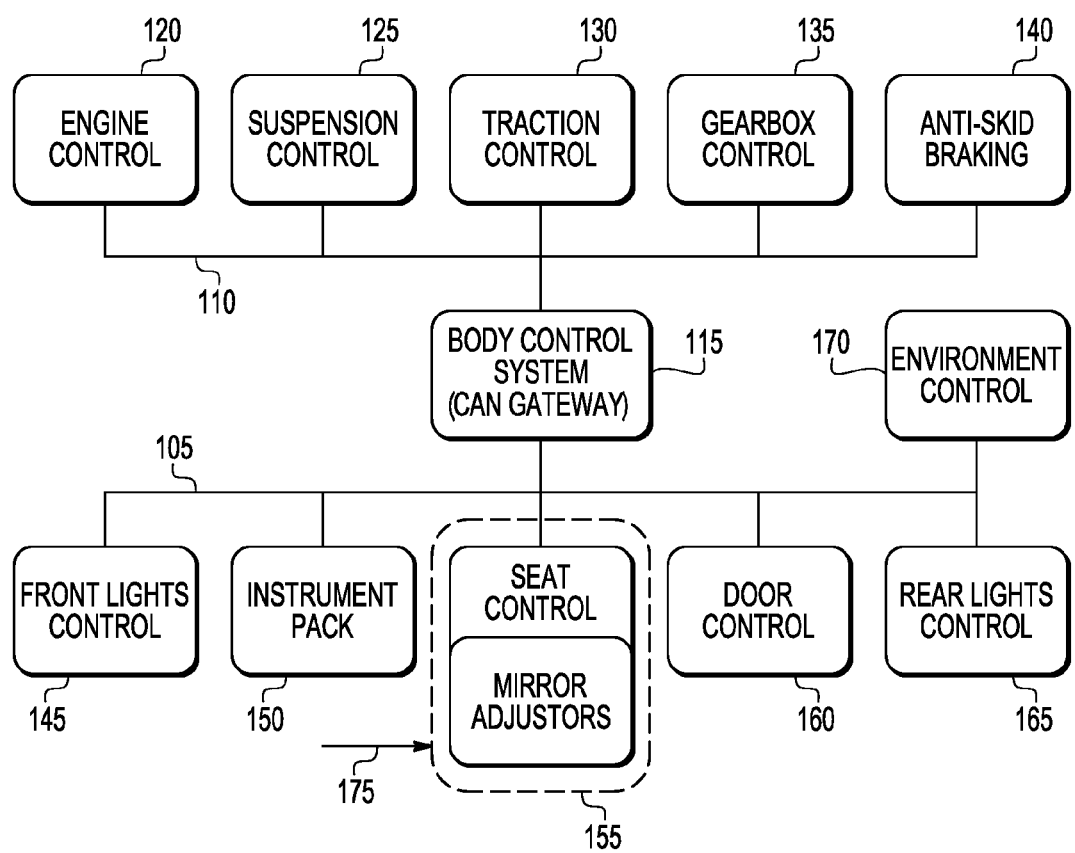
FIG. 1 is a block diagram of a CAN network in an automotive environment according to some embodiments.

Turning to FIG. 1, a block diagram of CAN network 100 in an automotive environment is depicted. In some embodiments, one or more of nodes or devices 115-170 may be implemented, at least in part, using one or more of the systems and methods described below. As illustrated, CAN gateway 115 (e.g., body control system) is coupled to low-speed CAN bus 105 (e.g., ISO 11898-3) as well as high-speed CAN bus 110 (e.g., ISO 11898-2), and it may be configured to enable communications between nodes across the two buses. Powertrain devices or nodes coupled to high-speed CAN bus 110 include: engine control 120, suspension control 125, traction control 130, gearbox control 135, and anti-skid breaking 140. Conversely, body control devices or nodes coupled to low-speed CAN bus 105 include front lights control 145, instrument pack 150 (e.g., dashboard displays and information systems, etc.), seat/mirror control 155, door control 160 (e.g., remote lock/unlock, windows, etc.), rear lights control 165, and environment control 170 (e.g., A/C, heater, particle filter, etc.).

It is emphasized that automotive CAN network 100 is shown only by way of example. Other nodes or elements may be present in CAN network 100, and those elements may be connected in different ways. In some cases, one or more of nodes 115-170 may be divided into sub-nodes. For instance, the mirror control portion of seat/mirror control node 155 may be coupled to single-wire CAN interface or bus 175. In other cases, one or more of nodes 115-170 may be combined into fewer nodes. Additionally or alternatively, one or more of nodes 115-170 may be networked using a Local Interconnect Network (e.g., ISO 7498) bus or other suitable communication bus. Examples of other types of devices or nodes that may be present in CAN network 100 include, but are not limited to, airbag controls, sunroof controls, alarms, navigation systems, entertainment devices (e.g., video, audio, etc.), parking assistance modules, communication modules (e.g., cellular, Bluetooth®, Wi-Fi®, etc.), diagnostic systems (e.g., on-board diagnostics), etc.

Figure 2:
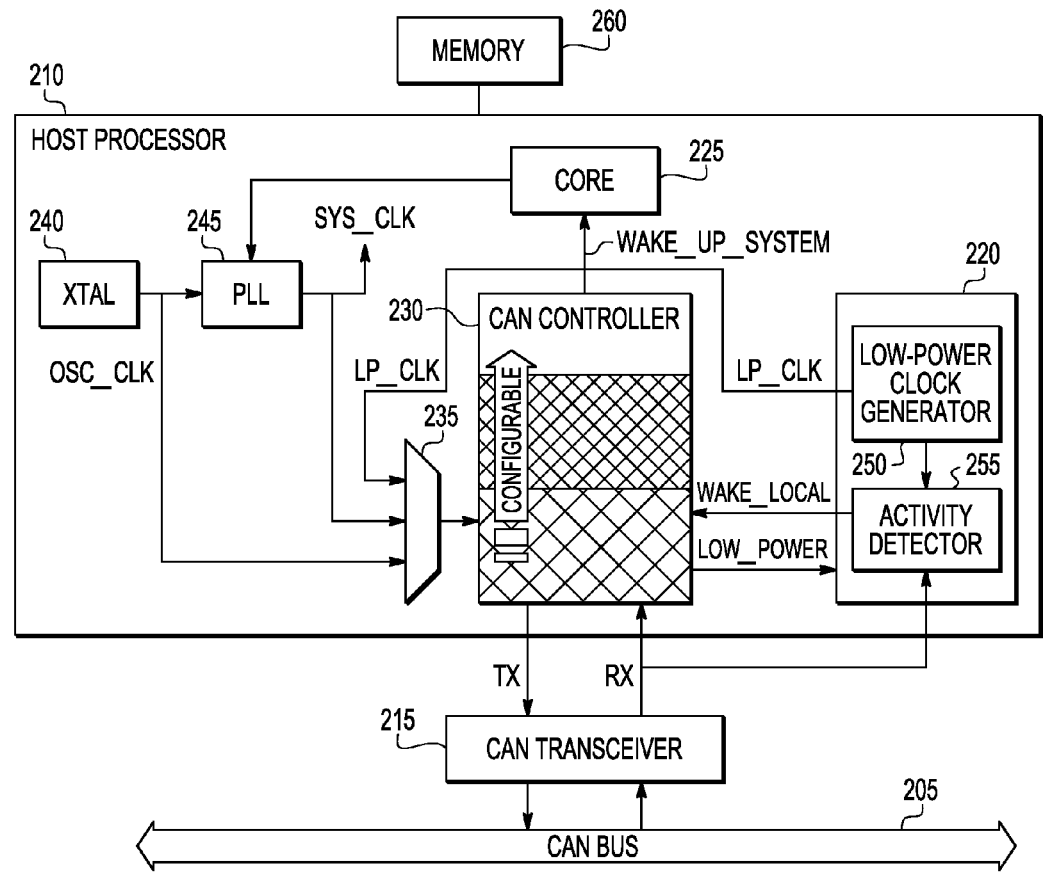
FIG. 2 is a block diagram of a CAN node according to some embodiments.
Figure 3:
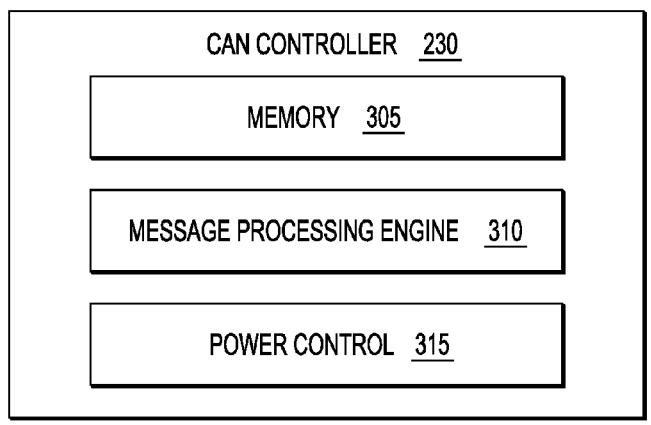
FIG. 3 is a block diagram of a CAN controller according to some embodiments.

In some embodiments, each of nodes 115-170 may include one or more host processors as well as one or more sensors and/or actuators configured to perform one or more operations. In addition, nodes 115-170 may communicate with each other in a multiplexed fashion over CAN network 100, which provides a multi-master broadcast serial bus. For example, each of nodes 115-170 may include a CAN controller integrated within its host processor and/or operably coupled thereto, as illustrated in FIGS. 2 and 3. As such, nodes 115-170 may be configured to send and receive messages to each other using their respective CAN controllers, each message being serially transmitted onto the CAN bus and having an identifier (ID) portion (e.g., 11 or 29 bits) and a payload portion (e.g., 8 bytes).

To promote energy efficiency, the power consumption of nodes 115-170 may be reduced under some circumstances, such as, for example, during periods when those nodes are inactive (e.g., when a vehicle is parked). Furthermore, as more processing intensive host processors are deployed, sleep or low power states or modes may be used to avoid excessive standby or quiescent electrical currents. Accordingly, some of nodes 115-170 may be configured with different operating modes, during one or more of which part (or all) of their operations may be halted. For instance, when a node becomes inactive, its host processor and/or CAN controller may be placed in a sleep or low power state during which its power consumption is reduced and one or more clocks are stopped. To resume certain operations, a node (or group of nodes) may receive a message over the CAN bus. The handling of such messages may be performed, at least in part (and sometimes entirely), by the node's CAN controller, as described in connection with FIGS. 4 and 5.

FIG. 2 is a block diagram of CAN node 200. In some embodiments, CAN node 200 may be one or more of nodes or devices 115-170 in FIG. 1. As illustrated, CAN node 200 includes host processor 210, which in turn includes crystal oscillator signal source 240, phase-locked loop (PLL) circuit 245, at least one processor core 225, multiplexing or selecting circuit 235, CAN controller 230, and detection circuit 220. CAN transceiver 215 is coupled to CAN bus 205 (e.g., one of buses 105 or 110 in FIG. 1), as well as CAN controller 230. The receiving output (RX) of CAN transceiver 215 is also coupled to detection circuit 220. Memory 260 is coupled to host processor 210. In this diagram, portion(s) of CAN node 200 that would be specific to a given deployment (e.g., particular sensor(s) and/or actuator(s)) have been omitted for sake of simplicity, although it should be understood that any number of different peripheral devices (not shown) may be coupled to host processor 210 via any suitable interface.

The illustrative, non-limiting implementation of CAN node 200 in FIG. 2 depicts CAN controller 230, multiplexing or selecting circuit 235, and detection circuit 220 integrated into host processor 210. In other implementations, however, CAN controller 230, multiplexing or selecting circuit 235, and/or detection circuit 220 may be, at least in part, physically separate from host processor 210 but otherwise operably coupled thereto. For example, two or more host processors 210 may use a single CAN controller 230 shared among them. In yet other implementations, detection circuit 220 or portion(s) thereof may be combined with CAN transceiver 215. More generally, it should be noted that numerous variations to CAN node 200 will be apparent to a person of ordinary skill in the art in light of this description. For instance, host processor 210 may include two or more processor cores (e.g., dual-core, quad-core, etc.), memory 260 and/or CAN transceiver 215 may be at least partially integrated within host processor 210, etc.

During normal operation, host processor 210 may be configured to execute one or more instructions stored in memory 260 to thereby perform its programmed tasks. One or more of these tasks may be specific to the node's purpose(s) within CAN network 100 (e.g., traction control node 130 performs traction control tasks). Other tasks may include processing CAN messages received (RX) over bus 205 through CAN transceiver 215 and CAN controller 230, and/or transmitting CAN messages (TX) over bus 205 through CAN controller 230 and CAN transceiver 215. In certain implementations, host processor 210 may also control or otherwise influence the operation and/or power consumption of CAN controller 230, as described in more detail below. When operating in normal mode, CAN controller 230 may store serially received bits from CAN bus 230 until an entire CAN message is received, which may then be provided to core 225 (e.g., upon the triggering of an interrupt). Conversely, CAN controller 230 may transmit CAN messages received from core 225 serially onto CAN bus 205 in an appropriate format.

Crystal oscillator signal source 240 may provide a clock signal ("OSC_CLK") that is processed by PLL circuit 245 to generate yet another clock signal ("SYS_CLK"), which may then be used by core 225 in host processor 210's high-power operating mode (e.g., a normal mode). In some situations, instructions stored in memory 260 may allow host controller 210 to reduce its power consumption and enter a low power or sleep mode. When operating in low power mode, host controller 210 may provide a reduced clock frequency to core 225 and other components, and/or host controller 210 may be at least partially powered down.

It should be understood that the various operating modes of host processor 210 and CAN controller 230 may be independent and/or different from each other. For instance, host processor 210 may be considered to operate in low power mode overall (e.g., because core 225 is receiving a reduced clock frequency) while CAN controller 230 operates in any of a plurality of different operating modes with varying amounts of power consumption.

In some cases, when host processor 210 operates in normal mode, detection circuit 220 may be powered down. Upon entering a low power or sleep mode, host processor 210 and/or CAN controller 230 may instruct detection circuit 220 to turn itself on (e.g., via "Low_power" signal). Detection circuit 220 may have its own low power clock generator 250, which provides a low power clock signal ("LP_CLK") sufficient to maintain CAN controller 230's operation while other clocks are turned off. Clock signals OSC_CLK, SYS_CLK, and LP_CLK also reach multiplexing or selecting circuit 235, which in turn may be configured to select one such signal and provide it to CAN controller 230 during one of its various operating modes. Although three clock signals are depicted in FIG. 2, it should be understood that any number of clock signals may be used.

Moreover, while host processor 210 and/or CAN controller 230 operate in low power or sleep mode, activity detector 255 may monitor activity over CAN bus 205 received through CAN transceiver 215. Upon detecting such activity (e.g., a recessive to dominant transition that stays in a dominant value for a configurable amount of time), detection circuit 220 may indicate the presence of a bus event to CAN controller 230 (e.g., via "Wake_local" signal). At that point, CAN controller 230 may leave its low power or sleep mode and may enter a "run mode." In various implementations, CAN controller 230's run mode may include one of a plurality of operating modes that allow it to process a CAN message potentially arriving over bus 205 with varying degrees of granularity, each mode consuming varying amounts of power, while host processor 210 (e.g., core 225) continues to operate in an overall low power or sleep mode.

The operating modes of CAN controller 230 may be configured or selected, for example, by host processor 210 (e.g., prior to having entered its own low power or sleep mode). Shaded areas shown in CAN controller 230 are used to illustrate that the controller's different modes of operation correspond to different levels or amounts of power consumption in its different regions or sections. For example, each mode of operation may be associated with different portions of CAN controller 230 receiving or accessing different supply voltages and/or clock signals. Moreover, each different mode of operation may implement a different message handling protocol. In some cases, CAN controller 230's selected mode of operation may implement a message handling protocol sufficient to identify a received CAN message and determine whether to process that message entirely on its own (i.e., while core 225 operates in low power or sleep mode) and/or whether to wake up core 225 from low power or sleep operation (e.g., via "Wake_up_system" signal).

Embodiments of host processor 210 may include, but are not limited to, application specific integrated circuits (ASICs), system-on-chip (SoC) circuits, digital signal processors (DSPs), field-programmable gate arrays (FPGAs), processors, microprocessors, controllers, microcontrollers (MCUs), or the like. Memory 260 may include any tangible memory apparatus, circuit, or device which, in some cases, may be integrated within host processor 210 as one chip. For example, memory 260 may include flip-flops, registers, Static Random Access Memory (SRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In other cases, memory 260 may also include one or more memory modules to which the memory devices are mounted, such as single inline memory modules (SIMMs), dual inline memory modules (DIMMs), etc. CAN transceiver 215 may provide a physical layer (PHY) interface. As such, CAN transceiver 215 may include circuitry configured to adapt signal voltage levels received from CAN bus 205 to voltage levels compatible with CAN controller 230, and it may also include one or more voltage or current protection circuits. CAN transceiver 215 may further include circuitry configured to transform signals received from CAN controller 230 into CAN signals suitable for transmission over CAN bus 205. In some embodiments, activity detector 255 of detection circuit 220 may include an edge detector or the like.

FIG. 3 is a block diagram of CAN controller 230 (shown in FIG. 2) according to some embodiments. As shown, CAN controller 230 includes memory 305, message processing engine or circuitry 310, and power control module or circuitry 315, which may be operably coupled to each other. During normal operation, engine 310 may cause one or more CAN messages provided by core 225 and/or stored in memory 305 to be transmitted over CAN bus 205 through CAN transceiver 215. Engine 310 may also receive one or more CAN messages provided by CAN transceiver 215 from CAN bus 205, decode and/or translate those received messages, and perform some additional processing. For example, in some cases, engine 310 may cause a received CAN message to be provided to core 225. Additionally or alternatively, engine 310 may compare the contents of a received CAN message (e.g., identification and/or data bits) against stored information (e.g., in memory 305) to determine whether to take some predetermined action in response to the received message, etc. For instance, engine 310 may select, depending upon the result of the comparison, one of a plurality of response messages stored in memory 305 to be transmitted over CAN bus 205 corresponding to the received CAN message, in some cases with little or no latency. Furthermore, the selection and transmission of such a response message may be performed autonomously and without intervention from core 225, which in some situations may allow host processor 210 to continue to operate in low power or sleep mode.

Memory 305 may be configured to buffer one or more received or transmitted CAN messages. In some cases, memory 305 may also be configured to store program instructions that allow engine 310 to process a received CAN message according to one or more of a plurality of different message handling protocols when CAN controller 230 is operating under a corresponding one of a plurality of operating modes. Additionally or alternatively, memory 305 may be further configured to store instructions that allow engine 310 to select between two or more operating modes in light of the contents of a received CAN message. Moreover, memory 305 may be configured to store one or more matching rules, filtering rules, or sequences of logical operations that allow engine 310 to determine whether to wake up host processor 210 from its low power or sleep mode.

Power control module 315 may be configured to implement and/or enforce one or more of CAN controller 230's plurality of operating modes. In various implementations, each operating mode may correspond to a different level or amount of power consumption. For example, a low power or sleep operating mode may maintain a certain level of activity within CAN controller 230 sufficient to enable it to come online in response to the "Wake_local" signal provided by detection circuit 220. Other operating modes may allow CAN controller 230 to process received CAN messages using predetermined sequences of one or more logical operations having varying levels of complexity.

Figure 6:
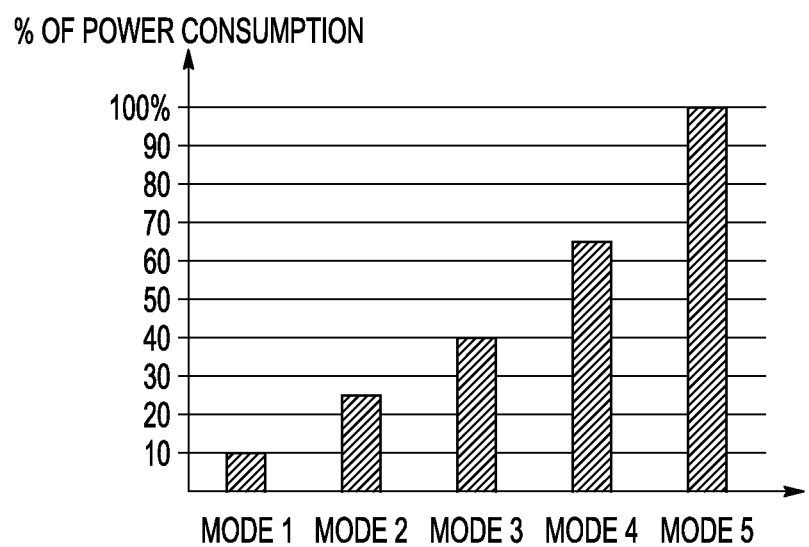
FIG. 6 is a chart illustrating an example of a CAN controller's operating modes according to some embodiments.

Accordingly, power control module 315 may selectively apply different clock signals (e.g., by controlling an input pin of multiplexer 235) to different sectors, regions or elements within CAN controller 230 in a manner consistent with the power consumption of a selected operating mode. Additionally or alternatively, power control module 315 may selectively control one or more power gates to turn on or shut down a circuit block (e.g., a RAM block, etc.) or operation at a lower voltage level within CAN controller 230. In some cases, power control module 315 may be configured to adaptably change CAN controller 230's operating mode during the processing of a received CAN message (i.e., "on-the-fly"), for example, as a function of the contents of the message as determined by engine 310. An example of different operating modes along with their respective power consumptions is depicted in FIG. 6.

In some embodiments, the modules or blocks shown in FIG. 3 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined into fewer blocks. Conversely, any given one of modules 305-315 may be implemented such that its operations are divided among two or more logical blocks. Although shown with a particular configuration, in other embodiments these various modules or blocks may be rearranged in other suitable ways.

Figure 4:
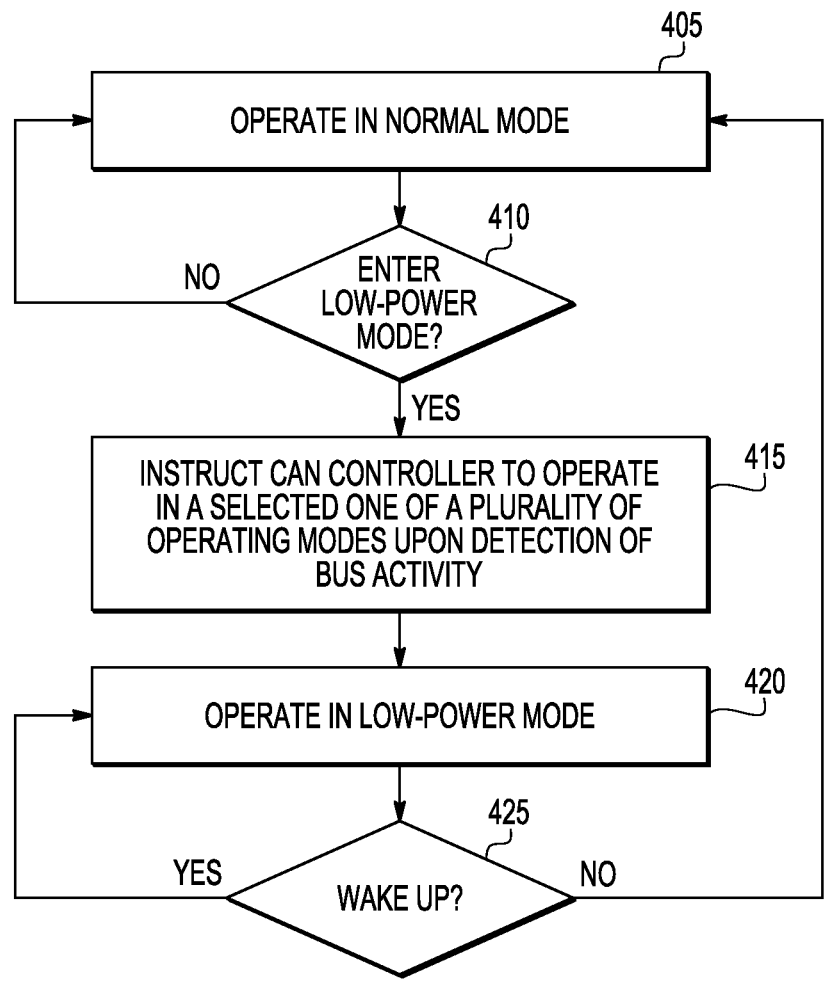
FIG. 4 is a flowchart of a method of selecting a low power mode of operation of a CAN controller by a host processor according to some embodiments.

FIG. 4 is a flowchart of method 400 of selecting a low power mode of operation of a CAN controller by a host processor. In some embodiments, method 400 may be performed, at least in part, by core 225 of host processor 210 (in FIG. 2) to control the operation of CAN controller 230. At block 405, method 400 includes operating in normal mode. For example, core 225 may be fully operational (e.g., using SYS_CLK) and executing one or more instructions stored in memory 260. At block 405, method 400 determines whether to enter a low power or sleep mode of operation. In some cases, such a decision may be software-based.

For instance, core 225 may have finished executing a sequence of instructions, and may no longer need to consume as much power. If so, control is passed to block 415; otherwise method 400 continues to operate in normal mode at block 405.

At block 415, method 400 includes instructing a CAN controller to operate in a selected one of a plurality of operating modes in response to a detection of bus activity. In some cases, the CAN controller may be configured with two or more possible operating modes. In other cases, the CAN controller may be configured with three of more possible operating modes. As such, core 225 may send a message to configure CAN controller 230 indicating which mode or message handling protocol CAN controller 230 should use to process a subsequent bus event (e.g., a potential incoming CAN message) when such an event is detected by activity detector 255. In other implementations, core 225 may send a message to configure CAN controller 230 indicating an allowable range of operating modes (e.g., two or more modes) that may be used by CAN controller 230 to process incoming CAN messages, and it may leave it up to CAN controller 230 to autonomously select one of the allowable modes with which to actually process the CAN message depending, for example, upon the contents of that message. In yet other implementations, core 255 may send a message to configure CAN controller 230 indicating a selected level of power consumption (e.g., as set by a standard), and the CAN controller may correlate that indication to a given mode of operation.

At block 420, method 400 includes operating in low power or sleep mode. For example, core 225 may operate with a reduced clock frequency and/or supply voltage.

Similarly, CAN controller 230 may also operate in low power or sleep mode. At block 425, method 400 may determine whether to "wake up" from the low power or sleep mode. For instance, in the case of core 225, it may wake up in response of an internal timer, sensor or actuator event, and/or a command or interrupt set by CAN controller 230 ("Wake_up_system" signal) in whichever mode core 225 has been programmed to wake up. Conversely, as previously noted, CAN controller 230 may wake up into the selected operating mode in response to the detection of activity on CAN bus 205 ("Wake_local" signal).

Here it should be noted that, in some cases, core 225 may be configured to operate one of either its (a) "normal" or "run" mode; or its (b) "low power" or "sleep" mode of operation at any given time. In other cases, however, core 225 may also be configured to operate in three or more operating modes (e.g., "run," "standby," "off," etc.), each mode corresponding to a different overall level of power consumption by host processor 210. Accordingly, with respect to core 225, the terms "low power" or "sleep" modes are used relative to one or more other, higher-power consumption modes (e.g., "normal" or "run" modes). Generally speaking, core 225's act of "waking up" includes switching from a lower-power consumption of activity mode to a higher-power consumption or activity mode—and not necessarily entering a full or maximum power-consumption mode.

Figure 5:
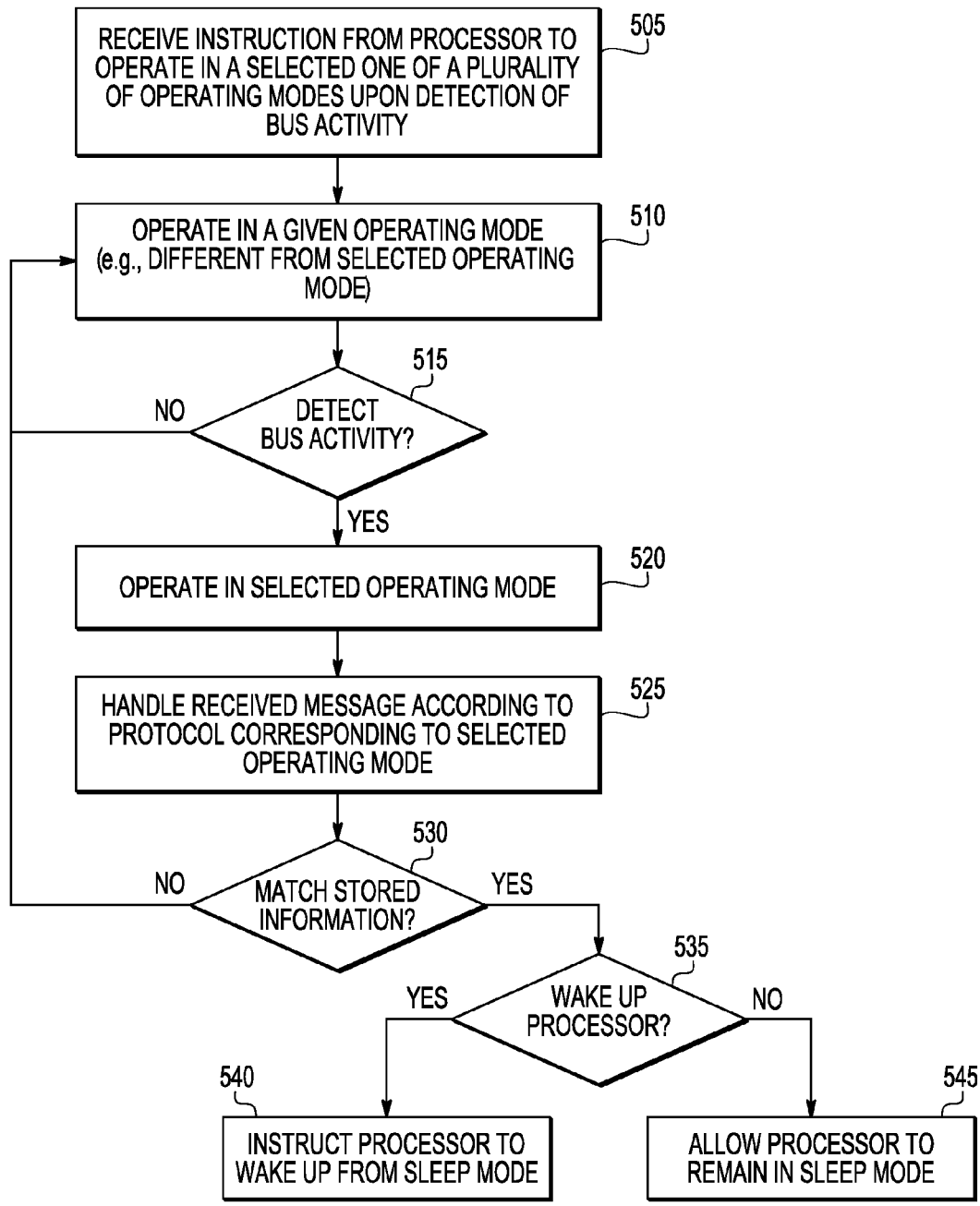
FIG. 5 is a flowchart of a method of handling messages in a CAN network by a CAN controller according to some embodiments.

FIG. 5 is a flowchart of method 500 of handling messages in a CAN network by a CAN controller. In some embodiments, method 500 may be performed, at least in part, by CAN controller 230 shown in FIG. 2. As counterpart to block 415 in FIG. 4, method 500 includes receiving an instruction from a processor to operate in a selected one of a plurality of operating modes upon detection of bus activity in block 505. For example, CAN controller 230 may receive a message from core 225 identifying a selected one of two or more, or three or more operating modes for CAN controller 230 to return to upon detection of bus activity by detector 255 (e.g., "Wake_local" signal). At block 510, method 500 includes operating in a given operating mode, which may be different from the selected operating mode. For example, in some cases, block 510 may be executed in connection with block 420 of FIG. 4 so that both core 225 and CAN controller 230 may enter a respective low power or sleep mode at approximately the same time—i.e., the "given operating mode" of block 510 is CAN controller 230's low power or sleep mode. As illustrated, block 510 is executed in response to block 505 so that, automatically upon receiving the indication of a selected operating mode, CAN controller 230 enters a low power mode or the like.

At block 515, method 500 determines whether a bus event or activity has been detected. For instance, CAN controller 230 may receive a Wake_local signal from detection circuit 220, in which case control passes to block 520; otherwise control returns to block 510 and CAN controller 230 continues to operate in its low power or sleep mode. At block 520, method 500 includes operating in the selected operating mode. For example, CAN controller 230 may leave the low power or sleep mode and enter a different operating mode that, while consuming a level or amount of power that is less than 100% of its full power, still allows it to handle a received CAN message to a configurable degree and at least in part independently of core 225, which in some situations may still remain in its own low power or sleep mode. As such, at block 525, method 500 includes handling or processing a received CAN message associated with the detected bus activity according to a message handling protocol corresponding to the selected operating mode. For instance, CAN controller 230 may compare message identification or other information from the received CAN message with stored or target identification information. In various embodiments, the level of matching or filtering employed as part of the message handling protocol corresponding to the selected operating mode may be configurable by the user.

At block 530, method 500 includes determining whether the information of the received CAN message matches the stored or target information according to the operations prescribed by the message handling protocol in use. Examples of matching rules or criteria that may be invoked at block 530 as part of the message handling protocol may include, but are not limited to: matching an exact CAN message ID, matching a CAN message ID within a range of IDs, matching the same CAN message ID a number N of times, matching a CAN message ID before a timeout, matching a combination of CAN message ID and selected payload information, etc. Each of these rules may invoke a different number and/or sequence of logical operations (e.g., to effect one or more comparisons, etc.). In some embodiments, it is the outcome of block 530 that determines whether the received CAN message is a "wake-up" message with respect to that CAN node—that is, if the CAN message matches the target information or is otherwise relevant to the CAN node, it may invoke certain action(s) on the part of the CAN node and therefore cause it to "wake up." Otherwise control returns to block 510 and CAN controller 230 may return to its original low power or sleep mode.

At block 535, method 500 includes determining whether to wake up the processor. For example, depending upon the results of the matching operation in block 530, block 535 may determine that the received CAN message needs further processing by core 225 (e.g., the received message requests a response message with data collected by a sensor coupled to host processor 210). If so, control passes to block 540 where method 500 includes instructing the processor to wake up from its low power or sleep mode (e.g., via a signal or interrupt). For instance, CAN controller 230 may transmit a Wake_up_system signal to core 225. Notably, however, at block 545, method 500 may allow the processor to remain in its low power or sleep mode, while continuing to process the received CAN message. For example, CAN controller 230 may autonomously retrieve a selected one of plurality of response messages from a buffer (e.g., memory 305) as a function of the current matching process or message handling protocol, and may cause the response message to be transmitted without the direct involvement of host processor 210 which, again, may remain in its low power or sleep mode.

As noted above, in some embodiments, method 500 may include receiving a range of allowable modes of operation at block 505—i.e., instead of a single, selected mode—and it may include switching between two or more of the allowable operating modes, for example, during the handling of the received CAN message. For instance, CAN controller 230 may enter a first operating mode in response to the detection of bus activity, and, upon processing at least a portion of the received CAN message, it may determine that a more sophisticated or processing-intensive message handling protocol is needed, desired, beneficial, or adequate (e.g., based on the contents of the CAN message). Insofar as that message handling protocol may be implemented under another of the operating modes within the range of operating modes allowed by the processor, CAN controller 230 may switch between those two modes as deemed appropriate (e.g., engine 310 may instruct power control module 315 to select another clock signal for certain sections of CAN controller 230 via multiplexer 235, etc.). Additionally or alternatively, in other embodiments, method 500 may include receiving an indication of a level of power consumption at block 505 (e.g., a range of allowed power consumption), and may correlate or infer, still at block 505, which of its operating modes fit that level of power consumption (e.g., using a look-up table or the like).

It should be understood that the various operations described herein, particularly in connection with FIGS. 4 and 5, may be implemented by processing circuitry executing software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

FIG. 6 shows chart 600 depicting a CAN controller's operating modes, such as CAN controller 230 depicted in FIG. 1. From the outset, it should be noted that these operating modes are provided for sake of illustration only, and that different implementations may include variations therefrom. In this particular example, when operating in "mode 1," CAN controller 230 may consume up to 10% of the total power otherwise available to it (e.g., when operating at full power). Accordingly, a message processing protocol associated with mode 1 may keep a relatively low level of operation and may be configured to match one fixed message only. When operating in "mode 2," CAN controller 230 may consume up to 25% of total power, and the message processing protocol may allow it to implement about up to 10% of all message-matching operations—e.g., it may compare some received CAN messages by scanning part of memory 305 (in FIG. 3).

In "mode 3," CAN controller 230 may use up to 40% of the total power otherwise available to it. The message handling protocol associated with mode 3 may be similar to that of mode 2, but with some message transmission ability added (e.g., a few messages). As such, in mode 3, CAN controller 230 may support one or more types of autonomous, remote responses. In "mode 4" CAN controller 230 may use up to 66% of the total power. The message handling protocol associated with mode 4 may be similar to that of mode 3, but this time reaching up to 50% of CAN controller 230's total message filtering or matching capacity, with some CAN message transmission arbitration functionality (e.g., priority-based arbitration or pre-arbitration). Further, the message handling protocol of mode 4 may allow CAN controller 230 to implement a received message queue, a received message FIFO memory, and/or a received message Rx buffer—for example, for receiving a same CAN message a number of times (stored in memory 305). In "mode 5," CAN controller 230 may use up to 100% of the total power otherwise available to it, thus operating at full-power under a message handling protocol configured to perform its entire array of message processing operations. In each of modes 1-5, CAN controller 230 may be able to process one or more received CAN messages without waking up core 225 from its low power or sleep mode.

Thus, as illustrated in the previous example, CAN controller 230 may be selectably configured or programmed to operate in one of a plurality of operating modes, each operating mode having a different level of power consumption, and therefore enabling a corresponding amount or degree of message processing operation(s) to take place independently of core 225. In some cases, two or more of these operating modes may be considered "low power modes" to the extent that they consume less that 100% of the total power otherwise available to CAN controller 230 (in this case, modes 1-4 are low power modes). In other cases, at least one of the operating modes may be a "normal mode" insofar as it consumes up to all of the power available to CAN controller 230 (in this case, mode 5 is a normal mode).

In some situations, prior to the detection of activity on CAN bus 205, CAN controller may operate in the lowest power mode available among the plurality of operating modes. For instance, still referring to the same example described above, at block 510 (in FIG. 5) the "given operating mode" may be mode 1, which allows a minimum amount of CAN message processing. Alternatively, prior to detection of activity on CAN bus 205, CAN controller 230 may follow an operating mode that does not allow any amount of CAN message processing to take place. More generally, a user may program or configure one or more of the operating modes of CAN controller 230 in a custom manner (e.g., via host processor 210), depending upon his or her particular application(s).

In some embodiments, the systems and methods described herein may enable the management and/or reduction of power consumption in CAN networks by selectively waking up CAN nodes left in standby, sleep, and/or low power modes of operation. Particularly, certain CAN nodes operating in low power modes as described herein may be capable of resuming normal operations upon receiving wake up messages that may either affect that individual node and/or a group of nodes. Furthermore, the original wake up message may be preserved (i.e., not lost, for example, due to a delay on the part of the CAN node to stabilize its receiving operations), the message matching or filtering criteria may be flexibly configured, and/or or response messages may be autonomously or independently transmitted. Specifically, a CAN controller may automatically perform one or more of these operations without the involvement of its host processor. As such, at least some of the techniques described herein are in line with "pretended networking" principles, where nodes may appear to one another as active in the network, but they may in fact be in an internal low power mode of operation.

In an illustrative, non-limiting embodiment, a method may include, in response to activity detected on a CAN bus, operating a CAN controller of a host processor in a selected one of a plurality of operating modes. The method may also include handling, by the CAN controller, a CAN message received over the CAN bus using a message handling protocol associated with the selected one of the plurality of operating modes, at least in part, while at least one processor core of the host processor operates in a low power mode. In some embodiments, each of the plurality of operating modes may correspond to a different amount of power consumption by the CAN controller. Moreover, handling the CAN message may include comparing, according to the message handling protocol, at least one portion of the CAN message to stored information. For example, at least one portion of the CAN message may include a message identification, and the stored information may include stored message identification information.

In some embodiments, the message handling protocol may include a sequence of one or more logical operations to be performed in the comparison between the message identification and the stored message identification information. In response to the at least one portion of the CAN message not matching the stored information, the method may include operating the CAN controller in another operating mode, the other operating mode corresponding to a lesser amount of power consumption than the selected operating mode. Additionally or alternatively, in response to the at least one portion of the CAN message matching the stored information, the method may include operating the CAN controller in yet another operating mode, the yet another operating mode corresponding to a higher amount of power consumption than the selected operating mode. The method may also include waking up the at least one processor core from the low power mode, at least in part, in response to the at least one portion of the CAN message matching the stored information.

In some implementations, handling the CAN message may include transmitting a selected one of a plurality of response messages by the CAN controller over the CAN bus without waking up the at least one processor core from the low power mode. The method may also include receiving, at the CAN controller, an identification of the selected one of the plurality of operating modes, the identification having been configured by the at least one processor core prior to the at least one processor core having entered the low power mode. The method may further include receiving, at the CAN controller, an identification of allowed ones of the plurality of operating modes, the identification having been configured by the at least one processor core prior to the at least one processor core having entered the low power mode, and identifying, by the CAN controller, the selected one of the plurality of operating modes among the allowed ones of the plurality of operating modes, at least in part, in response to contents of the CAN message.

In another illustrative, non-limiting embodiment, a CAN controller may include message processing circuitry configured to receive an indication of a selected one of a plurality of operating modes, each of the plurality of operating modes corresponding to a different level of power consumption and to a different CAN message handling protocol, the message processing circuitry configured to handle a received CAN message using a CAN message handling protocol associated with the selected operating mode. The CAN controller may also include power control circuitry operably coupled to the message processing circuitry, the power control circuitry configured to implement the selected operating mode within the CAN controller.

In some embodiments, the power control circuitry may be configured to switch operation from a low power mode to the selected operating mode, the selected operating mode corresponding to a higher level of power consumption by the CAN controller than the low power mode, and the message processing circuitry may be configured to attempt to match at least one portion of the received CAN message to stored information according to the CAN message handling protocol associated with the selected operating mode. Additionally or alternatively, the power control circuitry may be configured to switch operation from the selected operating mode to the low power mode in response to a failed match between the at least one portion of the received CAN message and the stored information by the message processing circuitry, and the message processing circuitry may be configured to wake up a host processor from a sleep mode in response to a successful match between the at least one portion of the received CAN message and the stored information.

The message processing circuitry may be further configured to transmit a selected one of a plurality of CAN messages in response to the received CAN message and without waking up a host processor from a sleep mode. Also, the indication of the selected one of the plurality of operating modes may include a selected one of the different levels of power consumption by the CAN controller, and the message processing circuitry may be configured to identify the selected one of the plurality of operating modes based, at least in part, upon the selected one of the different levels of power consumption.

In yet another illustrative, non-limiting embodiment, a CAN node may include a host processor comprising a core and a CAN controller operably coupled to the core, the CAN controller configured to receive an indication of at least one of a plurality of operating modes and to handle a received CAN message using a message handling protocol associated with the at least one of the plurality of operating modes while the core operates in a low power mode, each of the plurality of operating modes corresponding to a different amount of power consumption by the CAN controller. For example, the indication may identify a single one of the plurality of operating modes of the CAN controller, and it may be configured to cause the CAN controller to switch its operation from a low power mode to the single one of the plurality of operating modes to handle the CAN message. Alternatively, the indication may identify two or more of the plurality of operating modes, and it may be configured to allow the CAN controller to select one of the identified operating modes, at least in part, in response to information within the received CAN message.

In some implementations, the core may be configured to continue operating in the low power mode during handling of the received CAN message by the CAN controller and during transmission of a response message by the CAN controller. Additionally or alternatively, the core may be configured to wake up from the low power mode in response to a command or interrupt set by the CAN controller.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
receiving, from a host processor coupled to a Controller Area Network (CAN) controller, an instruction for the CAN controller to operate in a selected one of a plurality of operating modes upon detection of a selected one of a plurality of wake-up messages transmitted via a CAN bus, wherein each of the plurality of operating modes consumes less power than a fully operational mode;
operating a CAN controller in a given operating mode different from the plurality of operating modes, wherein the given operating mode consumes less power than any of the plurality of operating modes;
detecting the plurality of wake-up messages on the CAN bus;
identifying the selected wake-up message among the plurality of detected wake-up messages based, at least in part, upon a comparison between information contained in a payload of the selected wake-up message and stored information accessible to the CAN controller;
in response to the identification of the selected wake-up message, operating the CAN controller in the selected one of the plurality of operating modes;
performing a CAN task while in the selected one of the plurality of operating modes, based upon the information contained in the payload of the selected wake-up message, wherein the CAN task depends upon the type of CAN node to which the host processor and CAN controller belong; and
handling, by the CAN controller, a CAN message subsequently received over the CAN bus using a message handling protocol associated with the selected one of the plurality of operating modes, at least in part, while at least one processor of the host processor operates in a low power mode.

2. The method of claim 1, wherein each of the plurality of operating modes corresponds to a different amount of power consumption by the CAN controller.

3. The method of claim 1, wherein the instruction to operate in the selected one of the plurality of operating modes allows the CAN controller to operate in any of a subset of the plurality of operating modes, and wherein selection of the selected operating mode among the subset of operating modes is performed by the CAN controller based upon the information contained in the payload of the selected wake-up message prior to the at least one processor core having entered the low power mode.

4. The method of claim 1, wherein at least one portion of the CAN message includes a message identification, and wherein the stored information includes stored message identification information.

5. The method of claim 4, wherein the message handling protocol includes a sequence of one or more logical operations to be performed in the comparison between the message identification and the stored message identification information.

6. The method of claim 1, further comprising:
in response to the information contained in the payload of a given wake-up message not matching the stored information, operating the CAN controller in another operating mode, the other operating mode corresponding to a lesser amount of power consumption than the selected operating mode; or
in response to the information contained in the payload of the given wake-up message matching the stored information, operating the CAN controller in yet another operating mode, the yet another operating mode corresponding to a higher amount of power consumption than the selected operating mode.

7. The method of claim 1, further comprising:
waking up the at least one processor core from the low power mode, at least in part, in response to the information contained in the payload of the selected wake-up message matching the stored information.

8. The method of claim 1, wherein handling the CAN message includes transmitting a selected one of a plurality of response messages by the CAN controller over the CAN bus without waking up the at least one processor core from the low power mode.

9. The method of claim 1, further comprising:
receiving, at the CAN controller, an identification of the selected one of the plurality of operating modes, the identification having been configured by the at least one processor core prior to the at least one processor core having entered the low power mode.

10. The method of claim 1, further comprising:
receiving, at the CAN controller, an identification of allowed ones of the plurality of operating modes, the identification having been configured by the at least one processor core prior to the at least one processor core having entered the low power mode; and
identifying, by the CAN controller, the selected one of the plurality of operating modes among the allowed ones of the plurality of operating modes, at least in part, in response to contents of the CAN message.

11. A Controller Area Network (CAN) controller, comprising:
message processing circuitry configured to receive, from a host processor, an indication of a selected one of three or more operating modes, each of the three or more operating modes corresponding to a different level of power consumption and to a different CAN message handling protocol, the message processing circuitry further configured to process a given one of a plurality of CAN messages received over a CAN bus using a corresponding one of the different CAN message handling protocols, the message processing circuit further configured to identify one of the plurality of CAN messages as being relevant to the operation of the CAN controller based, at least in part, upon a comparison between information contained in a payload of the relevant CAN message and information stored in the CAN controller; and
power control circuitry operably coupled to the message processing circuitry, the power control circuitry configured to cause the CAN controller to operate in a low power mode configured to consume less power than any of the three or more operating modes, and perform the following operations in response to the message processing circuit's identification of the relevant CAN message among the plurality of CAN messages using a first CAN message handling protocol corresponding to the low power mode;(1) cause the CAN controller to operate in the selected operating mode; and (2) process the payload of the relevant CAN message and a payload of at least one subsequent CAN message using a second CAN message handling protocol corresponding to the selected operation mode, wherein the second CAN message handling protocol consumes more power than the first CAN message handling protocol.

12. The CAN controller of claim 11, wherein the indication allows the message processing circuit to operate in any of a subset of the three or more operating modes, and wherein selection of the selected operating mode among the subset of operating modes is performed by the CAN controller based upon contents of the payload of the relevant CAN message.

13. The CAN controller of claim 11, wherein the message processing circuitry is further configured to wake up the host processor from a sleep mode in response to a successful match between at least one portion of the payload of the relevant CAN message and the stored information.

14. The CAN controller of claim 11, wherein the message processing circuitry is further configured to select and transmit one of a plurality of CAN response messages in response to the received CAN message and without waking up the host processor from a sleep mode.

15. The CAN controller of claim 11, wherein the indication of the selected one of the plurality of three or more operating modes includes a selected one of the different levels of power consumption by the CAN controller, and wherein the message processing circuitry is further configured to identify the selected one of the plurality of three or more operating modes based, at least in part, upon the selected one of the different levels of power consumption.

16. A Controller Area Network (CAN) node, comprising:
a host processor including a core and a CAN controller operably coupled to the core, the CAN controller configured to receive, from the core, an identification of at least one of a plurality of operating modes to be employed by the CAN controller in response to the CAN controller's receipt of a particular CAN wake-up message transmitted among a plurality of other CAN wake-up message on a CAN bus coupled to the CAN controller, the CAN controller further configured to operate in another mode different from the at least one of the plurality of operating modes prior to receipt of the particular CAN wake-up message, the CAN controller further configured to handle CAN messages using a corresponding one of a plurality of different message handling protocols while the core operates in a low power mode, each of the plurality of operating modes corresponding to a different amount of power consumption by the CAN controller, the CAN controller further configured to identify the particular CAN wake-up message among a plurality of received CAN wake-up messages based, at least in part, upon a comparison between information contained in a payload of the particular CAN wake-up message and information stored in the CAN controller.

17. The CAN node of claim 16, wherein the identification specifies a single one of the plurality of operating modes of the CAN controller, and wherein the identification is configured to cause the CAN controller to switch its operation from a low power mode to the single one of the plurality of operating modes to handle the CAN wake-up message using a corresponding message handling protocol.

18. The CAN node of claim 16, wherein the identification specifies two or more of the plurality of operating modes, and wherein the identification is configured to allow the CAN controller to select one of the specified operating modes, at least in part, in response to identification information within the particular CAN wake-up message.

19. The CAN node of claim 16, wherein the core is configured to continue operating in the low power mode during handling of the particular CAN wake-up message by the CAN controller and during transmission of a response message by the CAN controller.

20. The CAN node of claim 16, wherein each of the plurality of different message handling protocols is configured to identify a given CAN wake-up message, at least in part, by matching a combination of CAN message ID and payload information.

* * * * *